(12) United States Patent
Helmer et al.

(10) Patent No.: US 10,100,893 B2
(45) Date of Patent: Oct. 16, 2018

(54) CLUTCH ASSEMBLY FOR COUPLING AN INTERNAL COMBUSTION ENGINE TO A DRIVE TRAIN OF A MOTOR VEHICLE AND METHOD FOR DAMPENING TORSIONAL VIBRATIONS IN A DRIVE TRAIN OF A MOTOR VEHICLE

(71) Applicant: Schaeffler Technologies AG & Co. KG, Herzogenaurach (DE)

(72) Inventors: Daniel Helmer, Ottenhofen (DE); Marc Finkenzeller, Gengenbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 232 days.

(21) Appl. No.: 15/035,380

(22) PCT Filed: Oct. 20, 2014

(86) PCT No.: PCT/DE2014/200566
§ 371 (c)(1),
(2) Date: May 9, 2016

(87) PCT Pub. No.: WO2015/070851
PCT Pub. Date: May 21, 2015

(65) Prior Publication Data
US 2016/0290426 A1 Oct. 6, 2016

(30) Foreign Application Priority Data

Nov. 13, 2013 (DE) .................. 10 2013 223 044
Mar. 28, 2014 (DE) .................. 10 2014 205 847

(51) Int. Cl.
*F16D 67/02* (2006.01)
*F16D 23/12* (2006.01)
(Continued)

(52) U.S. Cl.
CPC ............ *F16D 67/02* (2013.01); *F16D 13/52* (2013.01); *F16D 23/12* (2013.01); *H02K 49/043* (2013.01);
(Continued)

(58) Field of Classification Search
None
See application file for complete search history.

(56) References Cited

U.S. PATENT DOCUMENTS 3,624,437 A * 11/1971 Hoyler ................. H02K 49/043
310/53
3,868,005 A * 2/1975 McMillan ............... D06F 37/36
192/105 CS (Continued)

FOREIGN PATENT DOCUMENTS

| DE | 102012222110 | 6/2013 |
| JP | 2010163050 | 7/2010 |
| WO | 2007098521 | 9/2007 |

*Primary Examiner* — Colby M Hansen
(74) *Attorney, Agent, or Firm* — Volpe and Koenig, P.C.

(57) ABSTRACT

A clutch assembly for coupling an internal combustion engine to a drive train of a motor vehicle, having a frictional clutch for coupling a drive shaft of the internal combustion engine to an output shaft, an actuating device for opening and/or closing the frictional clutch, an eddy current brake for introducing an actuating force into the actuating apparatus, and a control apparatus for applying a defined, predetermined current to the eddy current brake, wherein the control apparatus is configured, in an acceleration phase of a torsional vibration of the drive shaft, to specify a current for opening, in particular for adjusting a slip operation, of the frictional clutch and, in a deceleration phase of the torsional vibration of the drive shaft, to specify a current for closing, in particular for rotationally-fixed, frictional coupling, of the frictional clutch for the eddy current brake. By changing the operating state of the frictional clutch using the eddy current (Continued)

brake, only low inertial masses of the actuating apparatus must be moved by a correspondingly low energy input in order to achieve an active dampening of torsional vibrations, such that an at least partial dampening of torsional vibrations in a drive train of a motor vehicle is enabled in an energy-efficient manner.

12 Claims, 2 Drawing Sheets

(51) Int. Cl.
    *H02K 49/04*     (2006.01)
    *F16D 13/52*     (2006.01)
    *H02K 7/108*     (2006.01)

(52) U.S. Cl.
    CPC .... *F16D 2023/123* (2013.01); *F16D 2300/22* (2013.01); *H02K 7/108* (2013.01)

(56) References Cited

U.S. PATENT DOCUMENTS

| | | | | |
|---|---|---|---|---|
| 4,410,819 A | * | 10/1983 | Kobayashi | H02K 7/10 310/105 |
| 4,790,212 A | * | 12/1988 | Sibeud | B60T 1/062 475/154 |
| 6,281,646 B1 | * | 8/2001 | Masberg | B60K 6/26 318/139 |
| 2005/0040000 A1 | | 2/2005 | Kelley, Jr. et al. | |
| 2009/0015087 A1 | | 1/2009 | Rossegger et al. | |
| 2014/0315682 A1 | | 10/2014 | Helmer et al. | |

\* cited by examiner

CLUTCH ASSEMBLY FOR COUPLING AN INTERNAL COMBUSTION ENGINE TO A DRIVE TRAIN OF A MOTOR VEHICLE AND METHOD FOR DAMPENING TORSIONAL VIBRATIONS IN A DRIVE TRAIN OF A MOTOR VEHICLE

BACKGROUND

The invention relates to a clutch assembly for coupling an internal combustion engine to a drive train of a motor vehicle, by which a torque optionally can be exchanged between the internal combustion engine and the drive train of the motor vehicle. The invention further relates to a method by which torsional vibrations can be dampened in a drive train of a motor vehicle.

A clutch assembly is known from DE 10 2012 222 110 A1 in which a drive shaft of an internal combustion engine is coupled via a freewheel to a ramp system of an actuating device for opening and closing a multiple disk clutch. In the closed state the multiple disk clutch can couple the drive shaft of the internal combustion engine to an output shaft and this way couple it to the drive train of the motor vehicle. The clutch assembly comprises an eddy-current brake integrated in a rotor of an electric machine, by which the multiple disk clutch can also be closed by the ramp system in order to introduce a torque from the drive train into the internal combustion engine, opposite the freewheel direction of the freewheel, in order to allow starting the internal combustion engine.

There is a constant need to reduce torsional vibrations in a drive train of a motor vehicle in an energy efficient fashion.

SUMMARY

The objective of the invention is to disclose measures which allow an at least partial dampening of torsional vibrations in a drive train of a motor vehicle in an energy efficient fashion.

The objective is attained according to the invention in a clutch assembly as well as a method with one or more features of the invention. Preferred embodiments of the invention are disclosed in the dependent claims, which may represent aspects of the invention individually or in combinations.

According to the invention a clutch assembly is provided for coupling an internal combustion engine to a drive train of a motor vehicle comprising a frictional clutch for coupling a drive shaft of the internal combustion engine to an output shaft, an actuating device for opening and/or closing the frictional clutch, an eddy-current brake for introducing an actuating force into the actuating device, and a control device for electrifying the eddy-current brake with a defined, predetermined current, with the control device being provided in an accelerating phase of a torsional vibration of the drive shaft to issue for the eddy-current brake a current for opening, particularly for adjusting a slip operation, of the frictional clutch and in the delay phase of the torsional vibration of the drive shaft a current for closing, particularly for the torque-proof, friction-fitting coupling of the frictional clutch.

When the internal combustion engine generates a torque and introduces it via the drive shaft into the clutch assembly, the conversion of the translational motion of a piston in a cylinder occurs into a rotary motion with the help of a crankshaft and a connecting rod engaging the piston, resulting in torsional vibrations, which represent an integral multiple of the nominal speed of the internal combustion engine ("engine order") and transmit into the drive train. By the torsional vibrations the speed and the torque of the drive shaft can increase periodically, particularly in a sinusoidal fashion, ("acceleration phase") and reduce ("deceleration phase"). Due to the fact that in an operating state in which the internal combustion engine is coupled to the drive train the frictional clutch can be opened at least partially and/or temporarily with the help of an eddy-current brake when the torsional vibration is in its acceleration phase, here an unnecessary acceleration of the drive train can be avoided, so that the torsional vibration is at least partially dampened at the output shaft. Additionally or alternatively the frictional clutch can be closed in the deceleration phase with the help of the actuating force applied by the eddy current brake so that the torque provided by the drive shaft is not required. This way, any unnecessary delay of the drive train can be avoided in the deceleration phase of the torsional vibration as well, so that at the output shaft the torsional vibration is at least partially dampened. Here, it is only necessary to appropriately electrify the eddy-current brake, with it being possible that the electric energy required here can be provided particularly from an electric machine for driving the motor vehicle and/or a rechargeable battery, particularly a traction battery. In particular, it is not required here to appropriately accelerate rotating masses of the electric machine and to decelerate them to actively dampen the torsional vibrations. Instead, it is only necessary to move parts of the actuating device, which show considerably lower inert weights to be moved compared to the electric machine. The active dampening of the torsional vibrations of the internal combustion engine can therefore occur with respectively lower energy consumption. By changing the operating state of the frictional clutch with the help of the eddy current brake only low inert masses of the actuating device must be moved with correspondingly low energy consumption in order to achieve an active dampening of the torsional vibrations, so that an at least partial dampening of torsional vibrations in a drive train of a motor vehicle is possible in an energy-efficient manner.

In a completely closed operating state of the frictional clutch a torque-proof coupling is given in a friction-fitting fashion without any significant slippage. In a partially opened operating state of the frictional clutch the friction clutch is in the slip operating mode, so that an input side of the frictional clutch can rotate in reference to an output side of the frictional clutch with a rotational speed difference and at best slide friction is given between the input side and the output side. In a completely open operating state of the frictional clutch the input side of the frictional clutch is distanced from the output side of the frictional clutch such that no frictional contact is given between the input side and the output side. The motor vehicle is particularly embodied as a hybrid vehicle with an electric machine and/or a traction battery for a purely electric drive of the motor vehicle. The eddy-current brake may be coupled to the electric machine and/or to the traction battery for exchanging electric energy. The control device can appropriately adjust the progression of the current and/or the voltage of the power applied to the eddy-current brake, particularly as a function of the frequency, the phase, and/or the amplitude of the torsional vibration, in order to dampen the respective torsional vibration. In particular, an interference of several torsional vibrations can be considered appropriately by the control device, so that for example several engine orders can be simultaneously dampened. Further, by dampening with the help of the eddy-current brake and the respective friction clutch, operated in an oscillating fashion, a degree of dampening can already be achieved, by for example significantly reducing the amplitudes of the torsional vibrations, so that a torsional vibration damper, positioned downstream and/or upstream in the flux of the torque during traction mode, particularly a two-weight flywheel can be designed in a respectively simpler fashion.

An actuating device comprises particularly a ramp system, in which an input ramp can be rotated in reference to an output ramp, perhaps via interposed bearing elements, particularly bearing balls, in reference to each other in order to change the axial extension of the ramp system. In order to operate the actuating system the input ramp of the ramp system, preferably fixed in the axial direction, can be rotated in reference to the output ramp, particularly torque-proof in the circumferential direction. For this purpose, a respective torque can be introduced into the ramp system. For example, with the help of the eddy-current brake, torque generated by the electric machine of a hybrid vehicle can be introduced. The torque introduced can directly or indirectly act upon the input ramp, particularly after a torque conversion, for example with the help of a planetary gear upon the input ramp. The ramp system may be embodied as an actuation element for closing and/or opening the frictional clutch, with particularly the rear of the output ramp, pointing away from the input ramp, potentially serving as the compression area at a friction coating of the frictional clutch. The outlet ramp can therefore already form a compression plate and/or steel disk of the frictional clutch. The frictional clutch is embodied particularly as a wet or dry multiple disk clutch with several frictional pairings provided behind each other between an input part and an output part. Preferably, with the help of coolant, particularly oil, friction heat can be dissipated from the frictional clutch so that the frictional clutch can particularly be embodied as a wet multiple disk clutch. The frictional clutch may particularly have an input part and/or an output part, comprising a multiple disk carrier at which in the axial direction various disks are guided. The respective disk may be provided with frictional coatings or embodied as a steel disk. The frictional clutch may be opened (normally open) or closed (normally closed) in the default stage, when no actuating force is introduced via the actuating element.

The ramp system can therefore be used particularly for actuating the frictional clutch of the clutch assembly, with the help of which an internal combustion engine can be coupled to the drive train of a hybrid vehicle. Such a frictional clutch, also called "E-clutch", may represent a rotor-integrated clutch, which connects the internal combustion engine to an electric machine as well as the drive train. The E-clutch can here rotate with the rotor of the electric machine and/or couple the internal combustion engine to the rotor of the electric machine.

The electric machine can be used to start the internal combustion engine. If driving already occurs electrically at the time the internal combustion engine is being started, the electric machine can increase the actually provided moment by the starting moment of the internal combustion engine, while simultaneously the E-clutch can be closed. This way, torque can flow from the electric machine to the internal combustion engine in order to start the internal combustion engine. Here, particularly the transferable moment of the E-clutch can be adjusted to the starting moment in a very precise manner, so that no undesired longitudinal acceleration occurs at the motor vehicle.

In particular, a detection device coupled to the control device is provided for detecting torsional vibrations of the drive shaft. The progression of the speed and/or the torque of the drive shaft can be measured by the detection device. For this purpose, for example the progression of the speed of the drive shaft can be measured with the help of at least one speed sensor. The progression of the speed can be analyzed and at least one torsional vibration can be detected, which varies about a median value equivalent to the nominal speed of the drive shaft, particularly in a periodic fashion, preferably in a sinusoidal fashion. The detection device can particularly detect the frequency of the torsional vibration and/or the phase of the torsional vibration and/or the amplitude of the torsional vibration. Based on this information regarding the torsional vibration, the frequency, the phase, and/or the amplitude of the progression of the amperage and/or the voltage of the current applied at the eddy-current brake can be adjusted in a suitable fashion by the control device in order to dampen the respective torsional vibration.

Preferably, the detection device is implemented to determine the nominal speed of the drive shaft and from said nominal speed of the drive shaft calculate an engine order to be dampened by the control device. The nominal speed of the drive shaft can be detected particularly easily and can for example be deduced from a family of characteristics saved for the internal combustion engine without requiring any direct measurements at the drive shaft. Due to the fact that the torsional vibrations expected particularly match the engine orders, from the known nominal speed conclusions can easily be drawn about the frequency of the torsional vibration to be dampened. The control device can this way react particularly quickly to any change of the nominal speed and proactively consider the altering torsional vibrations during the dampening process.

It is particularly preferred for the amount of the current controlled by the control device oscillating with a dampening frequency, that the dampening frequency is equivalent to a frequency of the torsional vibration to be dampened, particularly the engine order, with the dampening frequency being phase-shifted in reference to the frequency of the torsional vibration to be dampened by a phase shift $\Delta\phi$, with it particularly applying $\Delta\phi=180°\pm30°$, preferably $\Delta\phi=180°\pm15°$, and particularly preferred $\Delta\phi=180°\pm5°$. This way, in the acceleration phase of the torsional vibration a decelerating moment and in a delaying phase of the torsional vibration an accelerating moment can be introduced via the frictional clutch, influenced with the help of the eddy-current brake, in order to dampen the torsional vibration.

In particular, the drive shaft is connected via a freewheel to the actuating direction, with the freewheel blocking in the traction mode in case the drive shaft is overhauled, and runs freely in case of the actuating device overhauled, with the eddy-current brake engaging the actuating device via a force flux extending past the freewheel. The eddy-current brake can bridge the freewheel, particularly in order to introduce torque from the drive train, particularly from an electric machine, into the internal combustion engine in order to start the internal combustion engine. Additionally, the moment for closing the frictional clutch can be introduced by the internal combustion engine itself, with the help of the actuating device, so that after the internal combustion engine has been started it is not necessary to introduce a permanent closing moment from the eddy-current brake. The control device can therefore control the eddy-current brake in a respectively flexible fashion over an appropriately wide operating range.

Preferably the eddy-current brake is coupled to a rotor of an electric machine for driving the motor vehicle. This way the eddy-current brake can be coupled to the electric machine for exchanging electric energy. Thus, a moment for operating the frictional clutch can be tapped from the electric machine with the help of the eddy-current brake. For example, the eddy-current brake can be impinged with a current in order to generate an electromagnetic field, which cooperates with a permanent magnet of the rotor of the electric machine such that via the eddy-current brake a torque can be deducted from the electric machine.

It is particularly preferred when the output shaft is connected to a torsional vibration damper, particularly a two-weight flywheel. The torsional vibration damper is particularly equipped for dampening torsional vibrations, which are different from torsional vibrations dampened with the help of the eddy-current brake. This way, a respectively larger frequency range of torsional vibrations can be dampened. Further, by dampening with the help of the eddy-current brake and the frictional clutch, operated in a respectively oscillating fashion, a degree of dampening can be achieved in which for example the amplitudes of the torsional vibrations are significantly reduced such that the torsional vibration damper, positioned upstream and/or downstream in reference to the torque flow during the traction mode of the internal combustion engine, can be designed in a respectively simpler fashion.

The invention further relates to a method for dampening torsional vibrations in a drive train of a motor vehicle, in which a clutch assembly, which may particularly be embodied as described above or further developed, is provided for coupling an internal combustion engine to the drive train of a motor vehicle, with the clutch assembly comprising a frictional clutch that can be operated with the help of an eddy-current brake for coupling a drive shaft of the internal combustion engine to an output shaft, the eddy-current brake closing the frictional clutch in a torque-proof fashion in a deceleration phase of a torsional vibration of the drive shaft, and in an acceleration phase of the torsional vibration of the drive shaft the eddy-current brake opens the frictional clutch and/or operates it in a slip operation. The method can particularly be embodied as explained above according to the clutch assembly and further developed. By changing the operating state of the frictional clutch with the help of the eddy-current brake only low inert masses of the actuating device need to be moved with an accordingly low consumption of energy in order to achieve an active dampening of the torsional vibrations, so that at least partial dampening of the torsional vibrations is possible in a drive train of a motor vehicle in an energy-efficient fashion.

In particular, a frequency of the torsional vibration of the drive shaft is determined and the eddy-current brake is electrified with a dampening frequency matching the frequency of the torsional vibration, with the dampening frequency being phase-shifted in reference to the frequency of the torsional vibration to be dampened by a phase shift $\Delta\phi$, with here it particularly applying $\Delta\phi=180°\pm30°$, preferably $\Delta\phi=180°\pm15°$, and particularly preferred $\Delta\phi=180°\pm5°$. This way, a deceleration moment can be introduced in the acceleration phase of the torsional vibration and an accelerating moment in a deceleration phase of the torsional vibration via the frictional clutch, influenced by the eddy-current brake, in order to dampen the torsional vibrations.

Preferably, the torsional vibration of the drive shaft to be dampened is an engine order of the internal combustion engine, with the engine order being particularly determined by a nominal speed of the internal combustion engine. The nominal speed of the drive shaft can be particularly easily detected and can for example be taken from a family of characteristics saved for the internal combustion engine without any direct measurement at the drive shaft. Due to the fact that the torsional vibrations to be expected are particularly equivalent to the engine orders, the frequency of the torsional vibration to be dampened can easily be concluded from the known nominal speed. This way, a particularly quick reaction can occur upon a change of the nominal speed and proactively changing torsional vibrations can be considered when dampening.

BRIEF DESCRIPTION OF THE DRAWINGS

In the following, the invention is explained with reference to the attached drawings based on preferred exemplary embodiments, with the features shown in the following potentially representing an aspect of the invention either individually as well as in combinations. Shown are.

DETAILED DESCRIPTION OF THE PREFERRED EMBODIMENTS

Figure 1:
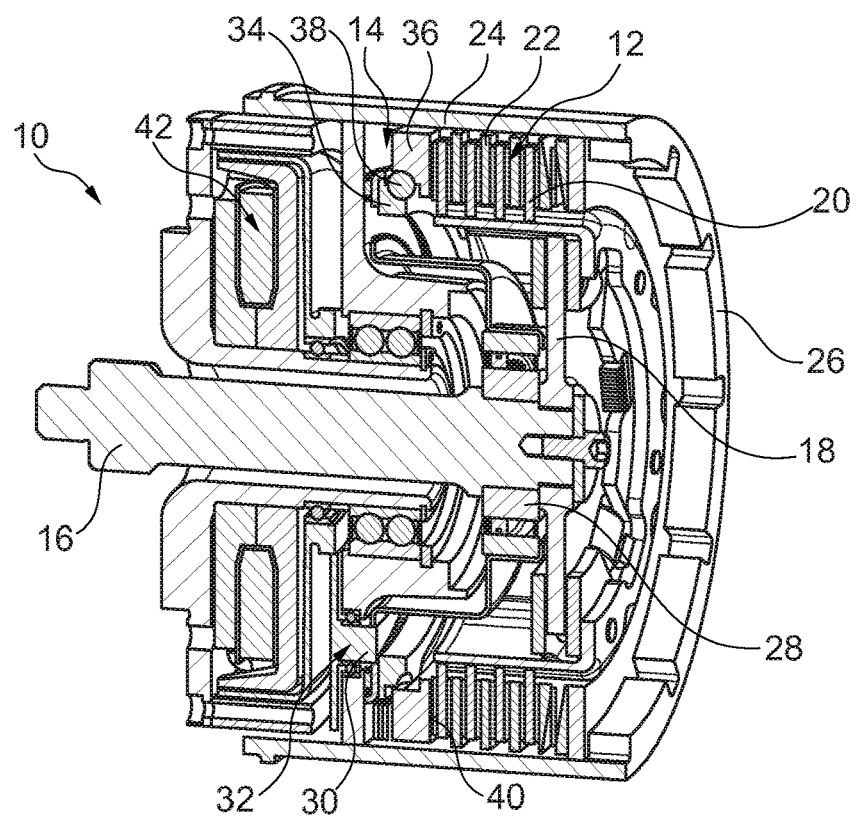
FIG. 1: a schematic, perspective cross-section of a clutch assembly.

The clutch assembly 10 shown in FIG. 1 is embodied as a rotor of an electric machine of a hybrid vehicle, otherwise not shown in greater detail, and comprises a frictional clutch 12 embodied as a multiple disk clutch, which is operated with the help of an actuator device 14. The clutch assembly 10 comprises a drive shaft 16 of an internal combustion engine, by which a torque generated by the internal combustion engine can be introduced into the clutch assembly. An internal disk carrier 18 of the frictional clutch 12 is connected to the drive shaft 16 in a torque-proof fashion. The internal disk carrier 18 has internal disks 20, which in order to transfer a torque can be compressed with the external disks 22 of an external disk carrier 24 in a friction-fitting fashion. The external disk carrier 24 is embodied in one piece with the output shaft 26 embodied as a hollow shaft. The output shaft 26 may be coupled for example via a clutch to the transmission input shaft of a motor vehicle transmission.

The drive shaft 16 is additionally coupled via a freewheel 28 and a planetary wheel 30 of a planetary gear 32 to an input ramp 34 of the actuating device 14. The input ramp 34 can be rotated in reference to an output ramp 36, axially displaceable and torque-proof in reference to the external disk carrier 24, supporting the input ramp 34 via bearing balls 38. In order to close the frictional clutch 12 the input ramp 34 can be rotated in reference to the output ramp 36 such that the total extension of the ramp system formed by the input ramp 34 and the output ramp 36 increases in the axial direction and a rear 40 of the output ramp 36 pointing away from the input ramp 34 is displaced towards the frictional clutch 12. The rear 40 can here already form a compression plate of the frictional clutch 12. The freewheel 28 blocks when the drive shaft 16 overruns, so that the torque introduced by the drive shaft 16 can also be used for closing the frictional clutch 12. When the drive shaft 16 is not driven by the internal combustion engine, because the internal combustion engine is turned off, for example, the freewheel 28 is in the free running position so that the drag moment of the internal combustion engine is decoupled from the drive train.

In particular, when an electric machine drives the output shaft 26, the torque of the electric machine can be used to start the internal combustion engine. For this purpose, with the help of the eddy-current brake 42 a portion of the torque of the electric machine can be tapped and guided via the planetary gear 32, bridging the freewheel 28, to the input ramp 34 of the actuating device 14 in order to close the frictional clutch 12. In the closed state of the frictional clutch 12, a torque of the drive train, particularly generated by the electric machine, can be introduced into the drive shaft 16 in order to start the internal combustion engine.

When the internal combustion engine is started, torque is introduced into the clutch assembly 10 via the drive shaft 16, which exhibits torsional vibrations in the frequency of the engine orders. These rotary oscillations can be dampened with the help of a control device controlling the current of the eddy-current brake 42. For this purpose, the current of the eddy-current brake 42 can oscillate offset with the frequency of the torsional vibrations such that by an at least partial opening of the frictional clutch, particularly in slip operation, and a complete closing of the frictional clutch the torsional vibrations can be counteracted.

Figure 2:
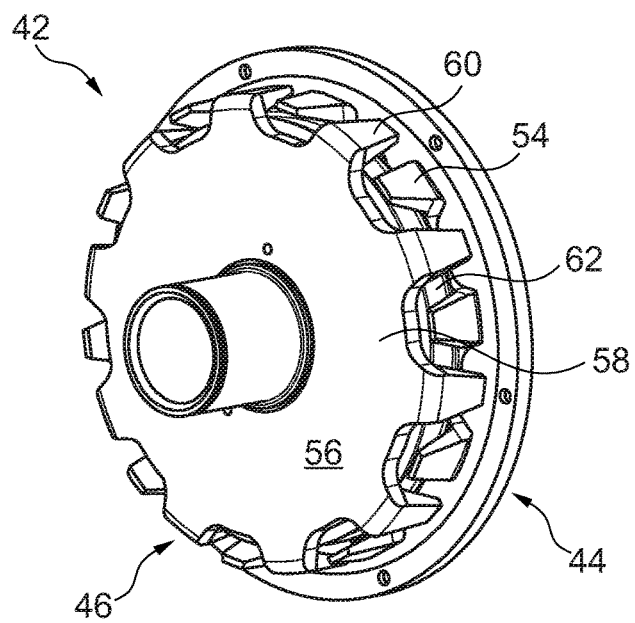
FIG. 2: a perspective view of an eddy-current brake for the clutch assembly of FIG. 1, FIG. 3: a schematic, perspective cross-section of the eddy-current brake of FIG. 2, and FIG. 4: a schematic, perspective diagram over the temporal progression of torque occurring in the clutch assembly of FIG. 1.
Figure 3:
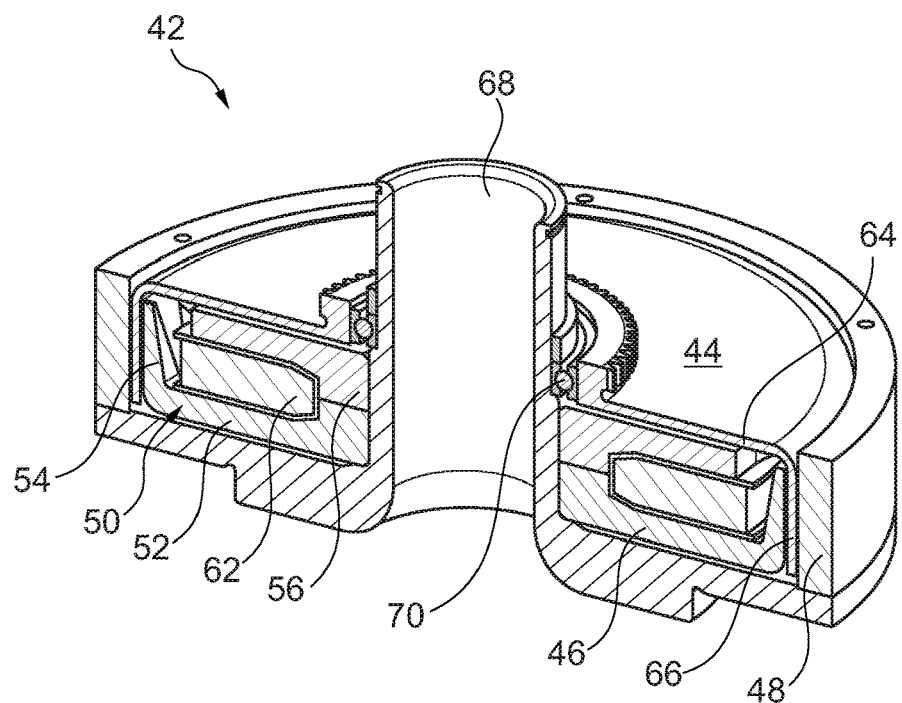

The eddy-current brake 42 shown in FIGS. 2 and 3 comprises a brake stator and a brake rotor 44. The brake stator comprises an inner stator 46 and an outer stator 48. The inner stator 46 comprises a first claw terminal 50 with a first disk section 52 and first terminal claws 54. The inner stator 36 comprises a second claw terminal 56 with a second disk section 58 and second terminal claws 60. The inner stator 46 comprises a central coil 62. The first terminal claws 54 of the first claw terminal 54 are arranged radially at the outside of the first disk section 52. The first terminal claws 54 of the first claw terminal 54 are each offset by an angle of approximately 90° from the first disk section 52 and respectively have a free, narrowly tapering end. The first terminal claws 54 of the first claw terminal 54 are arranged distributed in the circumferential direction at the first disk section 52. Gaps are formed between the first terminal claws 54 of the first claw terminal 54. The second terminal claws 60 of the second claw terminal 56 are arranged at the second disk section 58 radially at the outside. The second terminal claws 60 of the second claw terminal 56 are respectively offset by an angle of approximately 90° in reference to the second disk section 58 and each show a free, narrowly tapering end. The second terminal claws 60 of the second claw terminal 56 are arranged distributed in the circumferential direction at the second disk section 58. Gaps are formed between the second terminal claws 60 of the second claw terminal 56. The first claw terminal 50 with its first disk section 52 and the second claw terminal 56 with its second disk section 58 are arranged at both sides of the central coil 62. The first terminal claws 54 of the first claw terminal 50 and the second terminal claws 60 of the second claw terminal 56 encompass the central coil 62 radially at the outside. The free ends of the first terminal claws 54 of the first claw terminal 56 and the free ends of the second terminal claws 60 of the second claw terminal 56 are aligned opposite each other. The first terminal claws 54 of the first claw terminal 50 and the second terminal claws 60 of the second claw terminal 56 mutually engage alternating. The first claw terminal 50 and the second claw terminal 56 encompass the central coil 62 radially at the inside.

The brake rotor 44 comprises a cup-shaped form with a floor section 64 and a wall section 66. The brake rotor 44 is arranged with its floor section 64 at the second claw terminal 56 and with its wall section 66 radially outside of the inner stator 44. The outer stator 306 is embodied without coils and shows a thin, flat annular form. The outer stator 306 is magnetically permeable. The outer stator 306 is arranged radially at the outside of the brake rotor 302. The inner stator 46 and the outer stator 48 are connected fixed to a carrier part 68. The carrier part 68 comprises a flange section and a hub section. The carrier part 68 and the outer stator 48 form a housing-like seat for the inner stator 46 and the brake rotor 44. The first claw terminal 60 is arranged at the flange section of the carrier part 68. The hub section of the carrier part 68 projects through a central recess of the inner stator 46. The brake rotor 44 is supported via a bearing 70 at the hub section of the carrier part 68 in a rotary fashion.

Figure 4:
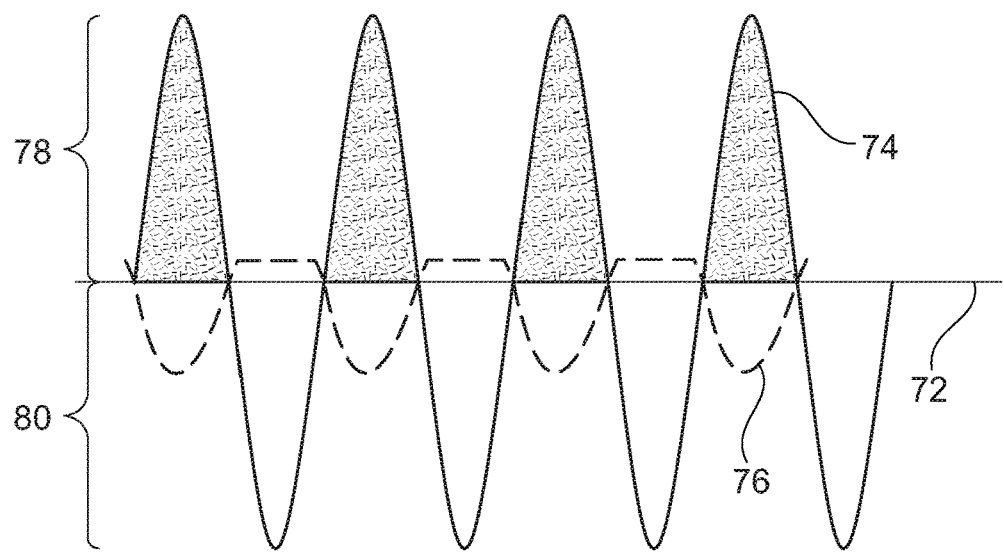

As shown in FIG. 4, in case of an essentially constant nominal rotation 72 of the drive shaft 16, the torque 74 and/or the corresponding speed may vary, with the temporal progression of the torque 74 essentially being sinusoidal, perhaps, and may be equivalent to an engine order of the internal combustion engine. By an oppositely oscillating actuation of the frictional clutch 12 using an appropriate electrification of the eddy-current brake 42 a counter-moment 76 can be generated, which at least partially can dampen the torsional vibration in the torque 72. The frictional clutch 12 can here alternate oscillating between the slip operation in an acceleration phase and a completely closed state 80 in a deceleration phase 80. In the acceleration phase 78 the torsional vibration tends to increase the nominal rotation, while in the deceleration phase 80 the torsional vibration tends to reduce the nominal speed.

LIST OF REFERENCE CHARACTERS

10 Clutch assembly
12 Frictional clutch
14 Actuating device
16 Drive shaft
18 Inner disk carrier
20 Inner disks
22 Outer disks
24 Outer disk carrier
26 Output shaft
28 Freewheel
30 Planetary wheel
32 Planetary gear
34 Input ramp
36 Output ramp
38 Bearing ball
40 Rear
42 Eddy-current brake
44 Brake rotor
46 Inner stator
48 Outer stator
50 First claw terminal
52 First disk section
54 First terminal claw
56 Second claw terminal
58 Second disk section
60 Second terminal claw
62 Central coil
64 Floor section
66 Wall section
68 Carrier part
70 Bearing
72 Nominal speed
74 Torque 76 Counter moment
78 Acceleration phase
80 Deceleration phase

The invention claimed is:

1. A clutch assembly for coupling an internal combustion engine to a drive train of a motor vehicle, comprising a frictional clutch for coupling a drive shaft of the internal combustion engine to an output shaft, an actuating device for at least one of opening or closing the frictional clutch, an eddy-current brake that introduces an actuating force into the actuating device, and a control device to electrify the eddy-current brake with a defined predetermined current, the control device being configured in an acceleration phase of a torsional vibration of the drive shaft to provide current for opening of the frictional clutch and in a deceleration phase of the torsional vibration of the drive shaft to provide current for closing of the frictional clutch for the eddy-current brake.

2. The clutch assembly according to claim 1, further comprising a detection device coupled to the control device for detection of torsional vibrations of the drive shaft.

3. The clutch assembly according to claim 2, wherein the detection device is configured to determine a nominal speed of the drive shaft and to calculate from the nominal speed of the drive shaft an engine order to be dampened by the control device.

4. The clutch assembly according to claim 3, wherein an amount of current controlled by the control device oscillates with a dampening frequency, with the dampening frequency being equivalent to a frequency of the torsional vibration to be dampened, with the dampening frequency being phase-shifted in reference to the frequency of the torsional vibration to be dampened by a phase shift $\Delta\phi$, with $\Delta\phi=180°\pm35°$.

5. The clutch assembly according to claim 1, wherein the drive shaft is connected via a freewheel to the actuating device, the freewheel blocks when the drive shaft overruns in a tensile direction and runs freely when the actuating device overruns, with the eddy-current brake engaging the actuating device via a flow of force extending through the freewheel.

6. The clutch assembly according to claim 1, wherein the eddy-current brake is coupled to a rotor of an electric machine for driving the motor vehicle.

7. The clutch assembly according to claim 1, wherein the output shaft is connected to a torsional vibration damper.

8. The clutch assembly according to claim 1, wherein the current for opening is for adjusting a slip operation of the frictional clutch.

9. The clutch assembly according to claim 1, wherein the current for closing is for a torque-poof, friction-fitting coupling of the frictional clutch.

10. A method for dampening torsional vibrations in a drive train of a motor vehicle, comprising providing a clutch assembly for coupling an internal combustion engine to the drive train of a motor vehicle, with the clutch assembly comprising a frictional clutch that is operated with an eddy-current brake for coupling a drive shaft of the internal combustion engine to an output shaft, in a deceleration phase of a torsional vibration of the drive shaft the eddy current brake closing the frictional clutch in a torque-proof fashion, and in an acceleration phase of the torsional vibration of the drive shaft the eddy-current brake at least one of opening the frictional clutch or operating the frictional clutch in slip operation.

11. The method according to claim 10, further comprising determining a frequency of the torsional vibration of the drive shaft and determining for the eddy-current brake a dampening frequency equivalent to the frequency of the torsional vibration, and phase-shifting the dampening frequency in reference to the frequency of the torsional vibration to be dampened by a phase shift $\Delta\phi$, with $\Delta\phi=180°\pm30°$.

12. The method according to claim 10, wherein which the torsional vibration of the drive shaft to be dampened is an engine order of the internal combustion engine, with the engine order being determined from the nominal speed of the internal combustion engine.

* * * * *